UNITED STATES PATENT OFFICE.

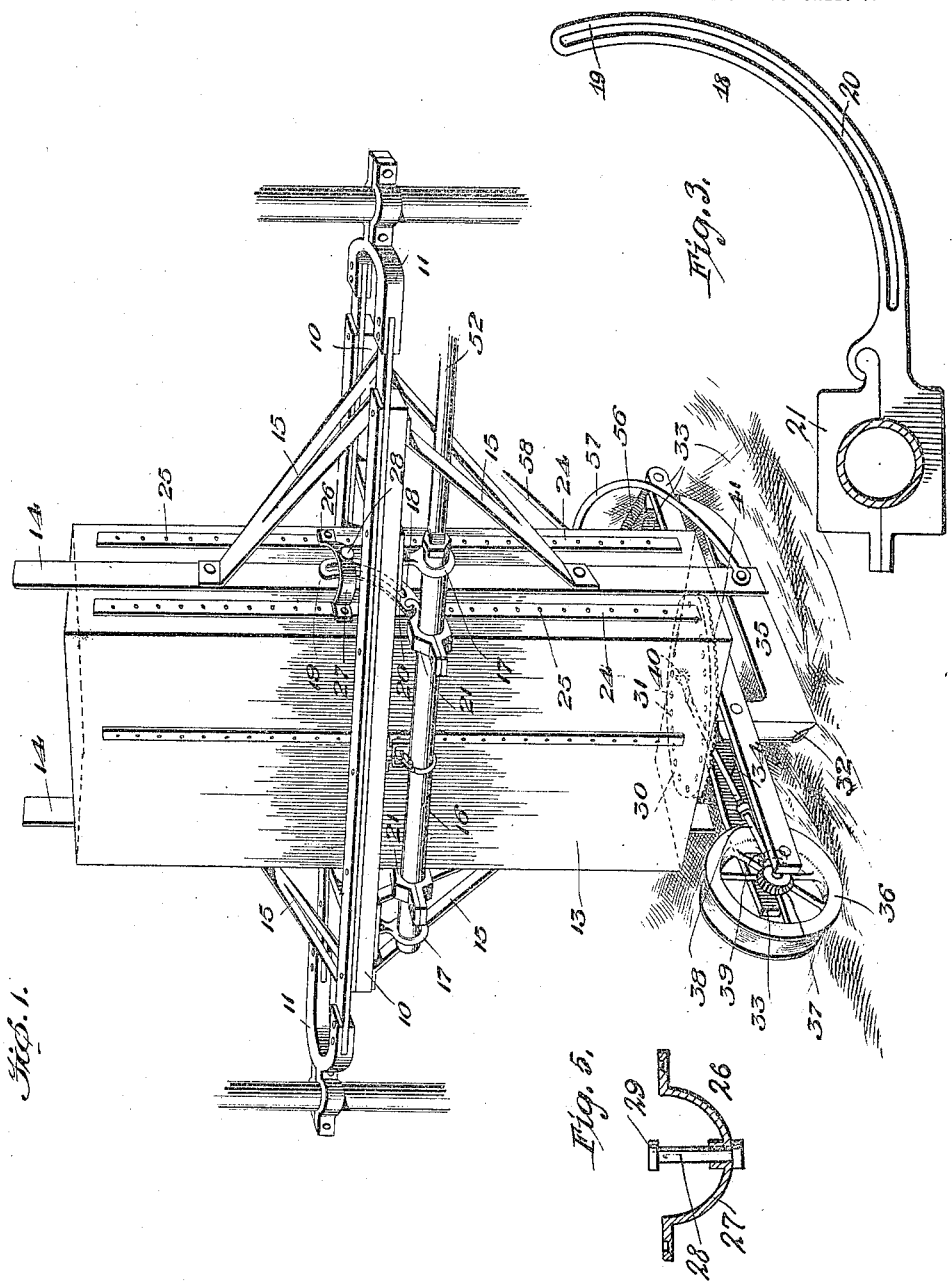

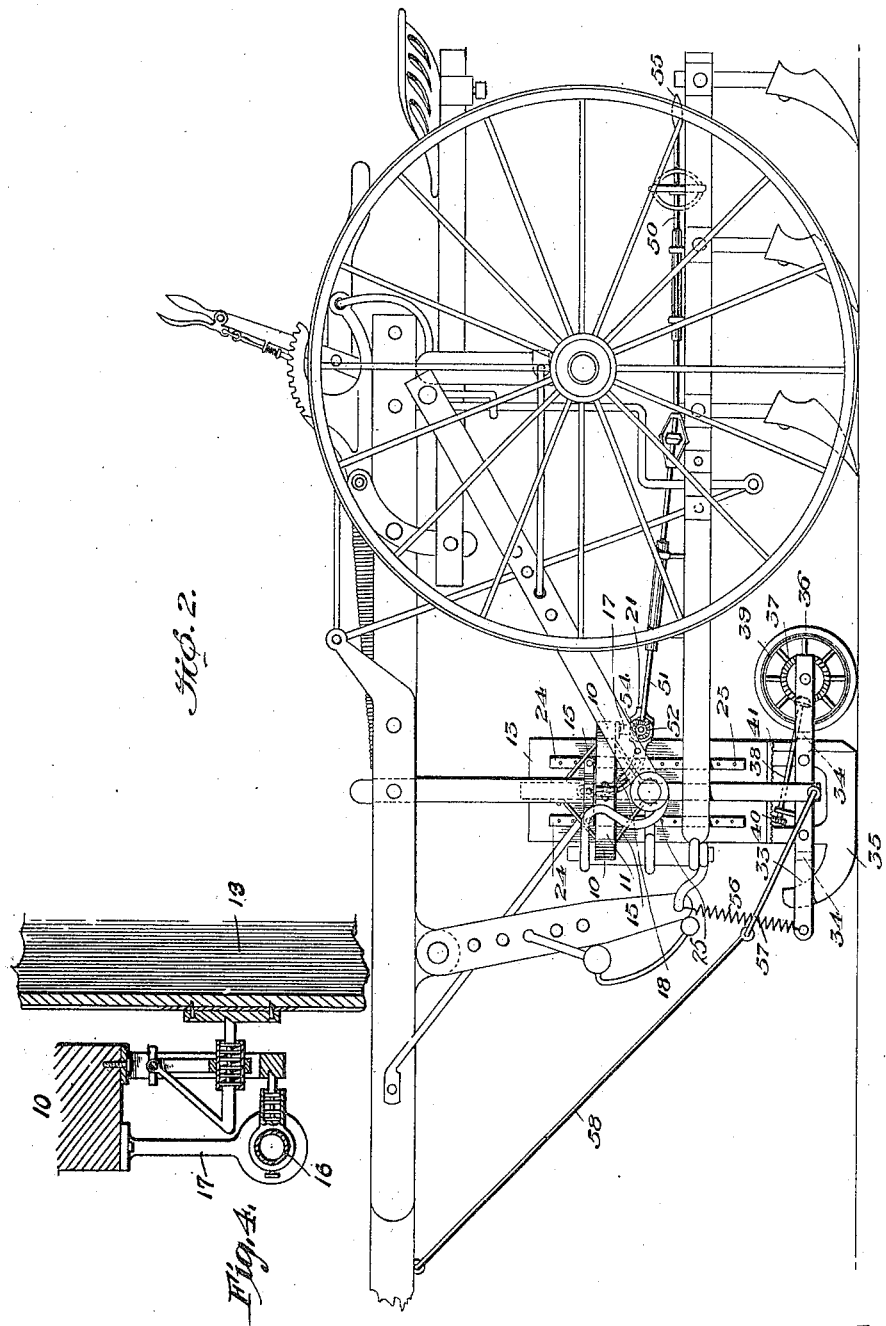

ROY A. HINES, OF COLUMBIA, MISSOURI.

PLANTING ATTACHMENT FOR CULTIVATORS.

1,306,900.     Specification of Letters Patent.   Patented June 17, 1919.

Application filed July 31, 1917. Serial No. 183,745.

*To all whom it may concern:*

Be it known that I, ROY A. HINES, a citizen of the United States, residing at Columbia, in the county of Boone and State of Missouri, have invented a new and useful Improved Planting Attachment for Cultivators, of which the following is a specification.

This invention relates to an improved planting attachment for cultivators and has for its object to provide a planting device to be mounted on a cultivator of the usual type, and easily and readily attached to and detached therefrom.

A further object is to provide a device of the class described in which the hopper feed mechanism is operated by an independent trailing wheel.

The preferred form of my invention is illustrated in the accompanying drawings in which like reference characters refer to corresponding parts throughout.

Figure 1 is a perspective view of my invention. Fig. 2 is a side elevation of my invention showing the same attached to a riding cultivator. Fig. 3 is detail view of the arm for operating the hopper. Fig. 4 is a detail of the catch for holding the hopper in an elevated position. Fig. 5 is a detail of a bracket attached to the hopper.

In the drawings the numeral 10 represents a pair of horizontal parallel bars, preferably rectangular in cross-section, horizontally disposed between the vertical posts of the arched axle of the cultivator by means of the brackets 11 which may be adjustably secured to said posts. Positioned between the bars and centrally of their ends, is a hopper 13 in which the grain to be sown is placed. The hopper is adapted for vertical adjustment between vertical guide bars 14, the latter being held in position by means of the braces 15 which are secured to the latter and to the bars 10, as shown in Fig. 1. A hollow shaft 16 is positioned parallel with and below the rear bar 10 on which it is journaled in brackets 17. Operating arms 18, each having a curved outer portion 19 provided with a slot 20 and an inner end portion provided with the clamping member 21, are secured to said shaft so that the outer curved portions will be adjacent the sides of the hopper having the guides.

On the sides of the hopper adjacent the guides are secured the metallic strips 24 which are provided with a plurality of threaded openings 25 adapted to receive screws by means of which brackets 26 (Fig. 5) are adjustably secured thereto. The said brackets are provided with an arched portion 27 adapted to bridge the guide, and a stud 28 having a head 29, the latter being operable in the slotted arm 18 whereby the hopper may be elevated or lowered with relation to the ground.

The bottom of the hopper is provided with a circular plate 30 having a plurality of openings 31 arranged adjacent its outer edge through which the seed in the hopper to be planted passes to the seed tube 32. Horizontally arranged beneath the bottom of the hopper is a frame composed of the parallel bars 33 held in spaced relation by the transverse braces 34. In this frame, between the bars 33, is secured a furrow opener or shoe 35 positioned below the bottom of the hopper, and a trailing wheel 36 carrying a bevel-gear 37, is journaled in the rear end of said frame. Journaled on one of the bars 33 is a drive shaft 38 having secured to one end thereof a bevel-gear 39 adapted to mesh with the gear 37, and on the other end a pinion 40 meshing with a rack 41 on the under face of the circular plate 30, whereby the latter may be rotated upon rotation of the wheel 37 when the latter comes into contact with the ground.

The mechanism for lowering the hopper consists of a shaft formed of a plurality of sections 50 and 51, each of which is suitably journaled on one of the cultivator beams, or in case of a walking cultivator to a portion of the cultivator beam and the handle secured to the latter. A shaft 52 also suitably journaled, is positioned parallel to the rear bar 10 and has an end which is rectangular in cross-section and extends a considerable distance into the hollow shaft 16 to which it is rigidly secured by any desirable fastening, such as a collar having a rectangular opening to receive said shaft end, and a set nut. The shaft sections 50 and 51 are operably connected to each other by means of a universal joint which is of the usual type of construction in general use, and the other end of the shaft section 51 is operably connected to the shaft 52 by the means of bevel gears 54. The outer end of shaft section 50 has secured thereto an operating lever 55 for rotation of the shaft sections 50 and 51 and the shaft 52.

To retain the hopper and its attached planting mechanism in a normal elevated position a coiled spring 56 is provided having one end secured to the forward end of the frame composed of the bars 33 and its other end to the cultivator frame or to the tongue of the same as may be most convenient according to the type of cultivator on which the device is used. I also provide a brace which comprises an arched member 57 and a rod 58, the former attached to the lower ends of the guides and the latter to the tongue of the cultivator whereby the said guides may be held in a more rigid position and facilitate the vertical adjustment of the hopper therebetween.

The operation of the device is as follows: The cultivator is used in the usual manner on a row of corn. When the operator comes to a portion of the corn-row in which the corn has failed to grow the operating lever is manipulated by the hand or foot, according to the type of cultivator in use, which lowers the hopper to the ground and the attached mechanism by means of the trailing wheel operates the attached planting mechanism and corn is deposited in the row in the place desired. The lever may then be manipulated in the opposite direction and the hopper and planting mechanism elevated to its normal position. By arrangement of the plurality of threaded openings in the metallic strips the hopper may be positioned at different heights from the ground according to the height of the corn being cultivated.

What I claim is:

1. In combination with a wheeled frame, a horizontally elongated open frame mounted transversely on said wheeled frame and having parallel side bars, vertical guide bars passing between said side bars and rigidly secured thereto, a rectangular hopper mounted for vertical sliding between said side bars and said vertical guide bars, said hopper having yokes straddling said guide bars, a rock shaft mounted on one of said side bars and having crank arms connected to said yokes for raising and lowering said hopper, seed planting means at the lower end of said hopper, and an earth engaging wheel carried by said lower end of the hopper for driving said seed planting means when said hopper is lowered to position said wheel upon the earth.

2. An attachment for wheeled implements comprising a horizontally elongated open frame having parallel side bars, means for mounting said frame upon the implement frame, a pair of vertical guide bars passing between and rigidly secured to said side bars, a vertically slidable hopper between said side and guide bars, said hopper having yokes straddling said guide bars, a rock shaft mounted on one of said side bars and having crank arms connected to said yokes for raising and lowering the hopper, seed planting means at the lower end of said hopper, and an earth engaging wheel carried by the hopper for driving said planting means when said hopper is lowered.

ROY A. HINES.

Witnesses:
C. B. SERBASTIAN,
J. G. LONG.

Copies of this patent may be obtained for five cents each, by addressing the "Commissioner of Patents, Washington, D. C."